United States Patent [19]

Ameling

[11] 3,967,923

[45] July 6, 1976

[54] PROCESS FOR THE WET TREATMENT OF TEXTILES

[75] Inventor: Bernhard Ameling, Coesfeld, Westphalia, Germany

[73] Assignee: Thies KG, Coesfeld, Westphalia, Germany

[22] Filed: Nov. 27, 1974

[21] Appl. No.: 527,801

[30] Foreign Application Priority Data

Dec. 1, 1973  Germany............................ 2359974

[52] U.S. Cl.................................... 8/149.1; 8/150; 8/155.1; 68/7; 68/189
[51] Int. Cl.² ........................................... D06B 5/18
[58] Field of Search............... 8/149.1, 149.2, 149.3, 8/150, 155.1, 155.2, 156, 157, 158; 68/5 C, 7, 8, 15, 184, 187, 189

[56] References Cited
UNITED STATES PATENTS

| | | | |
|---|---|---|---|
| 1,948,568 | 2/1934 | Faber et al......................... | 68/5 C X |
| 1,986,319 | 1/1935 | Bongrand et al. ................ | 68/189 X |
| 2,350,191 | 5/1944 | Raymond............................. | 68/189 |
| 3,058,327 | 10/1962 | Hablutzel et al................... | 68/184 X |
| 3,145,555 | 8/1964 | Krantz ................................. | 68/189 |
| 3,459,012 | 8/1969 | Renaud et al...................... | 68/189 X |
| 3,581,528 | 6/1971 | Mortensen........................... | 68/189 |
| 3,692,464 | 9/1972 | Furness............................... | 8/149.3 X |

*Primary Examiner*—Philip R. Coe
*Attorney, Agent, or Firm*—Otto John Munz

[57] ABSTRACT

This invention provides for a process for the wet treatment of textiles in which in a pressure-tight high-temperature resistant container the liquor always flows outwardly laterally at an angle from vertical through the inside of the textile material, flows down on the outside of the textile material to a sump situated beneath the latter and is pumped back from the sump into the interior of the textile material. Thus the material during the process is not immersed in the liquor and the influence of the high pressures and temperatures conventionally applied upon the textiles in their wet treatment is avoided and a lower liquid to textile ratio is employed.

The invention also provides an apparatus for carrying out the wet treatment of textiles, comprising a closed container, an insert member located within said container, means for supporting the textile material provided on the insert member, a liquor circulation system, a pump which communicates with the container, a heating and a cooling system, steam and coolant supply means, condensate and coolant outlets and means for measuring and controlling the level of liquid in the container.

13 Claims, 2 Drawing Figures

PROCESS FOR THE WET TREATMENT OF TEXTILES

FIELD OF THE INVENTION

Process and apparatus for the wet treatment of textiles, suspended above the treating liquor vertically or at an angle thereto.

THE PRIOR ART

According to known processes, the wet treatment and more particularly the dyeing of textiles such as in yarn packages or of loose textile material, is effected in closed, pressure-tight containers which are completely filled with the appropriate dyeing liquor, the liquor in the container being pumped at temperatures up to a maximum of 140°C through the textiles, which may be mounted on suitable holding means or may be held together by suitable devices. The heating of the liquor takes place during the circulation thereof, usually by way of a heating means which is arranged in the container, which is for example, a heat exchanger heated with steam, hot water or even oil. The ratio by weight between the textiles and the liquor, the so-called liquor ratio, is generally from 1:8 to 1:12, and usually about 1:10, respectively depending on the construction of the container in which the treatment is taking place, and whether the container is completely full.

It is also known, for example, to dye textiles in closed, pressure-tight containers, which contain the treatment medium only to such a level that the textile material is just washed over by the medium. The space which remains in the upper part of the container is then filled with gas, the pressure of the gas being adjusted so that it is higher than the evaporation pressure of the treatment medium, in order to prevent the evaporation thereof.

A feature common to both known processes is that considerable quantities of liquid, with the associated waste water problems, are rquired to pump the treatment medium inside the apparatus, by suitable reversing procedures, both in an outward direction and in an inward direction through the textile material.

For processes for the aftertreatment of the textiles, for example, for rinsing or cleaning operations, or even for the simple dyeing process, open containers are frequently also used, which containers are only partially filled with the treatment medium and in which the liquid flows only in one direction through the textiles, namely, outwardly from inside. With these open containers, however, it is possible to operate only at temperatures below 100°C.

SUMMARY OF THE INVENTION

An object of the invention is to provide a process for the wet treatment of textiles, permitting a lower ratio by weight between the textiles and the liquor than is usually employed, with a consequent saving in chemicals and heating energy.

Another object of the invention is to provide an improved process for the wet treatment, more particularly the dyeing of textiles, which process saves energy, water and chemicals.

Another object of the present invention is to provide a process and for the wet treatment and more particularly for the dyeing, of textiles, such as in a textile packages or of loose textile material with dyeing results, and; with a liquor ratio as good as or even better than is the case with the processes and apparatus of the prior art, and with a simultaneous reduction of waste water problems, of the quantity of the chemicals used and of the need for heating energy.

Yet another object of the invention is to provide with a lower liquor ratio a treatment in one direction, preferably outwardly from inside, and with an improved bath circulation with pumping capacity equal to that of the prior art, with the result that; there is a corresponding adaptation of the extraction speed of the treatment medium per revolution. Still another object of the invention is to employ the technique of partial filling of the container with the dye liquor, known per se in connection with open containers, with closed, pressure-tight containers and at the same time to work therewith at temperatures above 100°C, and to provide a treatment apparatus more efficient than such known to the prior art while saving energy and; costs both for fresh water and waste water.

Other objects of the invention and many of its advantages will become obvious to those skilled in the art from the following description taken in conjunction with the appended claims and drawings.

BRIEF DESCRIPTION OF THE DRAWINGS

In the drawings where the same reference numerals denote the same or equivalent parts.

DESCRIPTION OF THE PREFERRED EMBODIMENTS

Figure 1:
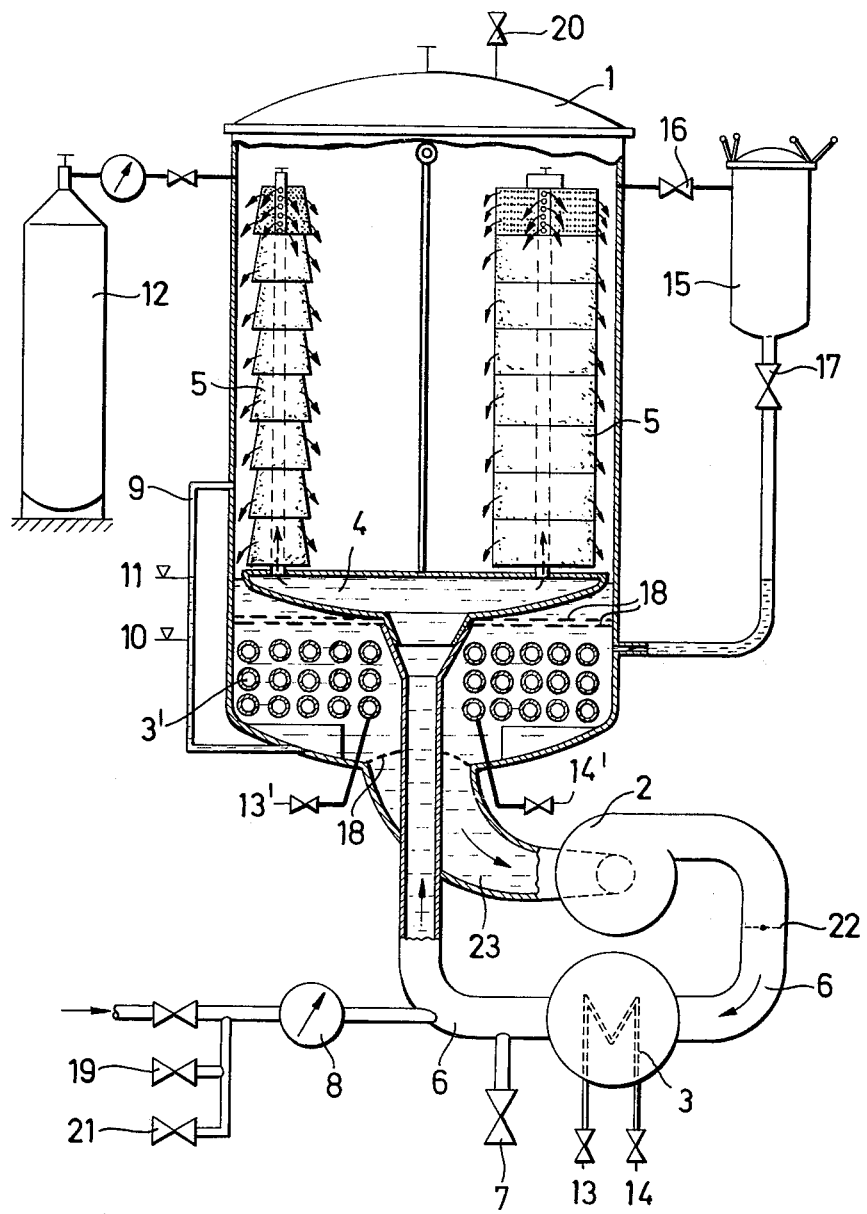
FIG. 1 is a partly cross sectional and partly diagrammatic view of the apparatus of the invention.

In the embodiment shown in FIG. 1, the apparatus comprises a closed container 1, having arranged therein an insert member 4 which carries the packages 5 or suitable packing cylinders for loose textiles and which communicates by way of the liquor circulating system 6 with a pump 2; heating and cooling systems 3,3' with steam and coolant supply means 13, 13' and condensate and coolant outlets 14, 14', respectively; a water gauge 9 with a minimum contact 10 and a miximum contact 11, and supply pipes for compressed air and chemicals. The container 1 is also equipped with a water supply system with an adjustable water quantity 8 and an outlet 7, and preferably communicates with a gas container 12 and a container 15 for the supply of chemicals during the treatment process by way of a supply valve 17 and an aerating valve 16. Horizontal or vertical baffle members 18 are arranged beneath the insert member 4 in the sump of the container and contribute to steadying the liquor at the inlet union of the pump from the container 1.

On starting up the process, the complete system can be evacuated by way of the vacuum valve 19. Thereafter, the system is preheated via the steam connection 21, the last residues of air are removed via the valve 20, and an inert gas, for example nitrogen, is introduced under pressure. With dye liquors which are compatible with air, compressed air may be introduced. When the butterfly valve 22 is closed, steaming of the textile material can be effected if desired simultaneously with the inflow of the steam; if this valve 22 remains open, the system is filled with steam without the packages themselves being traversed by the steam (diffusion).

Preferably the suction pipe 23 is kept from the pump to the container as short as possible and is enlarged in width for example as a funnel, or as a funnel-shaped bend with a cone angle of about 8°.

A liquor ratio of 1:3 to 1:6, more preferably from 1:4 to 1:5, is preferably maintained during the process. It is desirable to allow an inert gas which is under pressure to be operative on the liquor while it is flowing through the textile material. The process is carried out so that the same quantity of liquor is supplied under the same pressure to the textile material, for example, to each package or each packed cylinder, by maintaining a comparatively high flow of the liquor in the packages or packed cylinders. The flow is achieved in a simplest possible manner by way of the pump, which pumps the liquor into the interior of the packages or packed cylinders.

Figure 2:
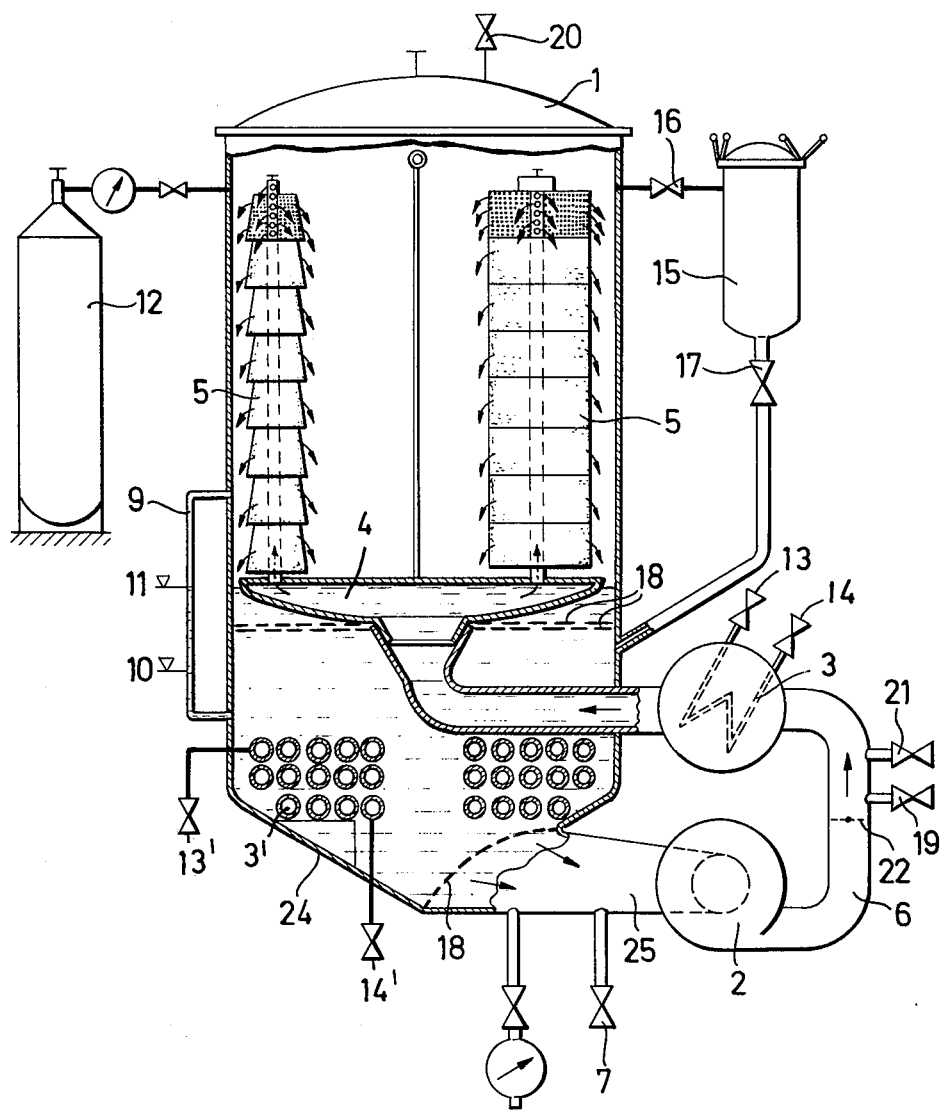
FIG. 2 is a modified embodiment of the apparatus shown on FIG. 1.

In FIG. 2, in which is shown a modified form of the apparatus illustrated in FIG. 1, the base 24 of the container 1 itself is formed as a funnel or hopper. The suction pipe 25 which is similarly widened out towards the container, does not have the liquor pressure pipe at a tangent thereto, so that a satisfactory flow of the liquor is guaranteed.

The advantages achieved by the process according to the invention, compared with the prior art processes, are considerable; not only is a completely uniform flow obtained through the textile material and a completely uniform treatment, for example dyeing, but in addition these advantages are combined with a great saving in fresh water and waste water in chemicals in the liquor and also in heat energy. These servings are the smaller quantity of liquor required to be used, compared with the amounts used in the known processes. A liquor ratio of only 1:5 is now necessary, compared with the usual liquor ratio of 1:10, to achieve the same effect, and in considerably shorter times. Thus savings of 50% are obtained with the use of the apparatus of the invention. The design of the apparatus is less complicated, since it is no longer necessary to provide means for the reversal of the liquor circulation and, in addition, the heating and cooling installations required are by far smaller than those necessary in the apparatuses of the prior art.

The process can be carried out not only in apparatus in which the yarn to be treated is arranged vertically, but with equal effect also in apparatus in which it is arranged horizontally.

I claim:

1. A process for the wet treatment of textiles by a treating liquor in a pressure-tight container suitable for use at high temperatures comprising the steps of:
   suspending said textile material above said liquor;
   subjecting said textile material to the flow of said treating liquor under pressure and elevated temperature outwardly from inside through the textile material to flow therethrough laterally at an angle to the vertical and down on the outside of the textile material below it and
   pumping back said treating liquor into the interior of said textile material, the ratio by weight between said textile material and said treating liquor is from about 1:3 to about 1:6, respectively.

2. A process according to claim 1 wherein the treatment liquor is a dye.

3. A process according to claim 1 wherein the textile material is in the form of a yarn package.

4. A process according to claim 3 in which there are a plurality of yarn packages and the same quantity of liquor is supplied under the same pressure to each yarn package the process being carried out under pressure of an inert gas.

5. A process according to claim 1 wherein the textile material is in the form of a cylinder of loose textile material.

6. A process according to claim 5 in which there are a plurality of cylinders of loose textile material and the same quantity of liquor is supplied under the same pressure to each cylinder of loose textile material, the process being carried out under pressure of an inert gas.

7. A process according to claim 1 in which the ratio by weight between said textile material and said treating liquor is from about 1:4 to about 1:5, respectively.

8. A process according to claim 1 in which the treatment is carried out in an inert gas under a pressure higher than the evaporation pressure of the treating liquor.

9. A process for the dyeing of yarn packages in a pressure-tight container by a dye suitable for use at high temperatures comprising the steps of:
   suspending each yarn package above said dye;
   subjecting each yarn package to the flow of said dye under pressure and elevated temperature outwardly from inside through the yarn package to flow therethrough laterally at an angle to the vertical and down on the outside of the yarn package below it and pumping back said dye into the interior of the yarn package, the dye ratio in said process being maintained between 1:4 and 1:5, and the process being carried out under pressure of an inert gas, the same quantity of dye being supplied under the same pressure to each yarn package.

10. A process for the dyeing of cylinders of loose textile material in a pressure-tight container by a dye suitable for use at high temperatures comprising the steps of:
    suspending each cylinder of textile material above said dye;
    subjecting each cylinder of textile material to the flow of said treating dye under pressure and elevated temperature outwardly from inside through the textile material to flow therethrough laterally at an angle to the vertical and down on the outside of the textile material below it and pumping back said treating dye into the interior of said textile material, the dye ratio in said process being maintained between 1:4 and 1:5, and the process being carried out under pressure of an inert gas, the same quantity of dye being supplied under the same pressure to each cylinder.

11. A process for the wet treatment of textiles as claimed in claim 1, further comprising the step of heating said liquor during the circulation thereof to a temperature up to 140°C.

12. A process for the wet treatment of textiles as claimed in claim 1, further comprising the step of subjecting the said textile material to steaming by diffusion.

13. A process for the wet treatment of textiles as claimed in claim 1, further comprising the step of controlling the level of the treating liquid within maximum and minimum limits above the treated material.

* * * * *